(12) United States Patent
Dehmann et al.

(10) Patent No.: US 10,915,309 B2
(45) Date of Patent: Feb. 9, 2021

(54) TECHNICAL CONFIGURATION DELTA-DRIVEN UPDATE AND DECOUPLING

(71) Applicant: SAP SE, Walldorf (DE)

(72) Inventors: Kai Dehmann, Rauenberg (DE); Mathias Habich, Mannheim (DE)

(73) Assignee: SAP SE, Walldorf (DE)

(*) Notice: Subject to any disclaimer, the term of this patent is extended or adjusted under 35 U.S.C. 154(b) by 127 days.

(21) Appl. No.: 16/211,562

(22) Filed: Dec. 6, 2018

(65) Prior Publication Data

US 2020/0183673 A1 Jun. 11, 2020

(51) Int. Cl.
 *G06F 11/00* (2006.01)
 *G06F 8/65* (2018.01)
 *G06F 11/14* (2006.01)

(52) U.S. Cl.
 CPC ............ *G06F 8/65* (2013.01); *G06F 11/1433* (2013.01); *G06F 2201/805* (2013.01)

(58) Field of Classification Search
 CPC .................................................. G06F 11/1433
 See application file for complete search history.

(56) References Cited

U.S. PATENT DOCUMENTS

| | | | | |
|---|---|---|---|---|
| 7,930,681 B2* | 4/2011 | Kloeffer | ................. | G06Q 10/06 717/120 |
| 8,176,483 B2* | 5/2012 | Hoefler | ..................... | G06F 8/65 717/171 |
| 8,516,091 B2* | 8/2013 | Savu | .................... | H04L 41/0813 709/220 |
| 8,554,516 B2* | 10/2013 | Dal Bello | .............. | G05B 23/02 702/185 |
| 9,065,705 B2* | 6/2015 | Schmidt | ............ | H04L 29/06551 |
| 9,959,114 B2* | 5/2018 | Narayanan | ................ | G06F 8/71 |
| 2008/0215558 A1* | 9/2008 | Marinelli | .................. | G06F 8/61 |
| 2010/0070539 A1* | 3/2010 | Bantlin | .................. | G06Q 30/06 707/803 |
| 2011/0131549 A1* | 6/2011 | Bozak | ....................... | G06F 8/71 717/121 |
| 2017/0286067 A1* | 10/2017 | Eberlein | ................... | G06F 8/30 |
| 2018/0365001 A1* | 12/2018 | Shimohata | ................ | G06F 8/65 |

OTHER PUBLICATIONS

ABAP Technical Configuration, Boris Zarske, last modified on Nov. 2, 2016. https://wiki.scn.sap.com/wiki/display/SL/ABAP+Technical+Configuration (Year: 2016).*

* cited by examiner

*Primary Examiner* — Elmira Mehrmanesh
(74) *Attorney, Agent, or Firm* — Buckley, Maschoff & Tawlalkar LLC

(57) ABSTRACT

A method and system including a technical configuration module; a software application; a technical configuration processor in communication with the technical configuration module and operative to execute processor-executable process steps to cause the system to: receive a change request including one or more changes to the software application; determine one or more changes to at least one object of a technical configuration of the changed software application; receive a virtual change request including a list of changed objects; and execute an update to the at least one object of the technical configuration based on the determined one or more changes received in the virtual change request. Numerous other aspects are provided.

20 Claims, 5 Drawing Sheets

TECHNICAL CONFIGURATION DELTA-DRIVEN UPDATE AND DECOUPLING

BACKGROUND

Technical configuration is a part of the lifecycle of computer software. An initial technical configuration is performed to set up and operate newly-installed software on a system. Additionaly, during the lifecycle of the software, technical parameters have to be set/re-set and adapted. Technical configuration may tailor the software to meet organization-specific requirements using tools supplied with the software. When the software changes, the technical configuration may need to be updated. While the updating of technical configuration may be automated, to some extent, there may be challenges associated with this automation.

Systems and methods are desired which support efficient updates to the technical configuration of computer software.

DETAILED DESCRIPTION

Figure 1:
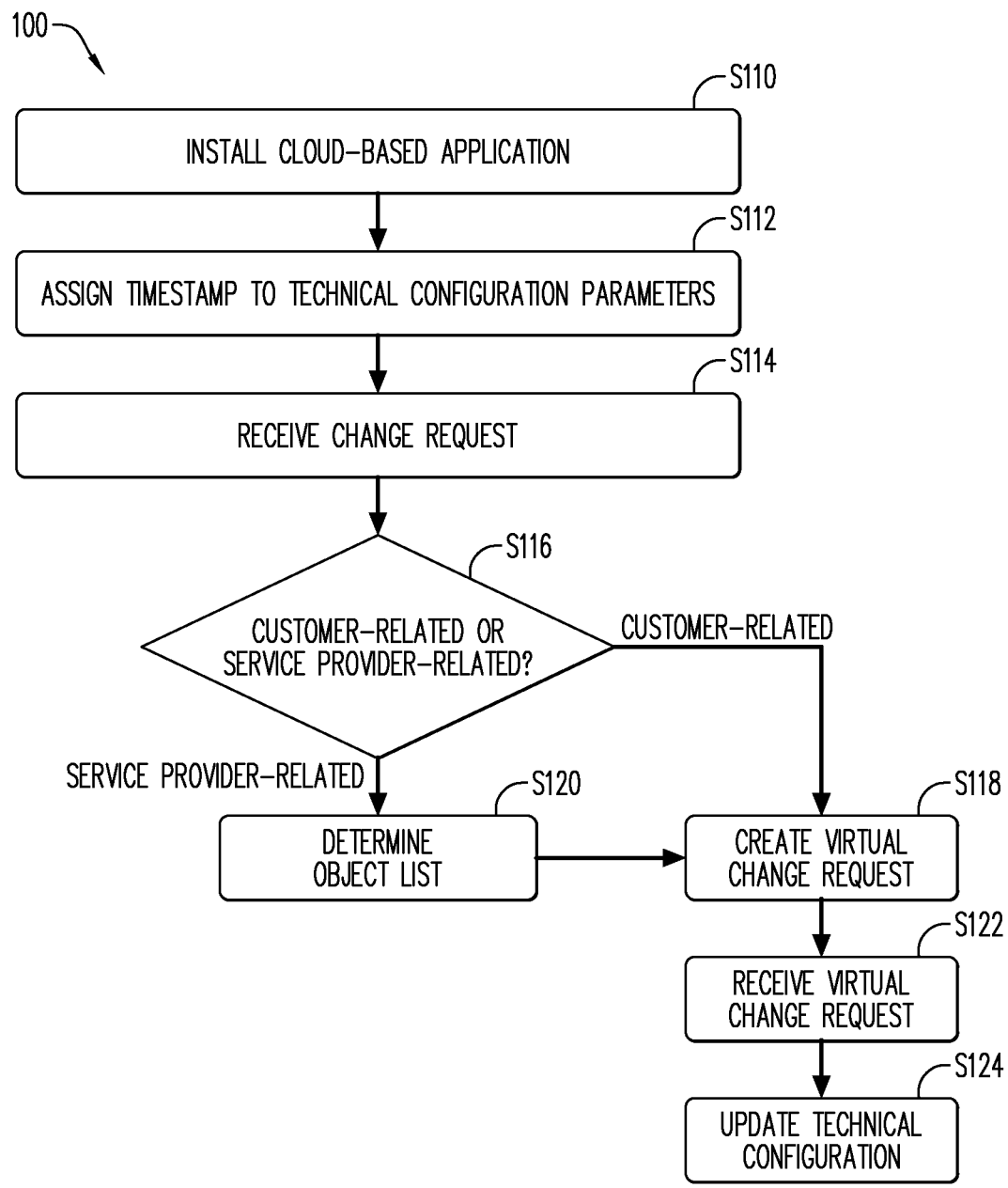
FIG. 1 is a flow diagram according to some embodiments.

The following description is provided to enable any person in the art to make and use the described embodiments and sets forth the best mode contemplated for carrying out some embodiments. Various modifications, however, will remain readily apparent to those in the art.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Cloud-based applications, services or resources (collectively referred to as a "cloud-based product") are made available to users on demand via the internet from a cloud computing provider's cloud platform (which includes, for example, the server hardware and operating environment). An aspect of the cloud-based product is the technical configuration thereof. For each of the cloud-based products, a technical configuration is performed to set up technical parameters so that the cloud-based product may operate as needed by the user. When the software of the cloud-based product has changed, the technical configuration may need to be updated. Some non-exhaustive examples of technical configurations that may need updating when the software changes include, Open Data (OData) protocol services which may need to be activated or deactivated, where the OData protocol services define a protocol for querying and updating of data using existing Web protocols; the authorizations of users may need to be adjusted; or elements of a user interface may need to be added or removed. (e.g., tiles of a SAP Fiori® launchpad may need to be added or removed).

A software change may be the result of: the upgrading of the software product due to a new release thereof; the application of a hotfix collection or emergency patch; extension, by a user or customer of the cloud platform, of a test system, for example, via the creation of custom business objects; and transportation, by the user or customer, of the extensions from the test system to the production system. Software changes may be the result of other suitable scenarios. A hotfix collection may refer to a package of information (e.g., one or more files) that is used to address a problem in a software product (i.e., a software bug). Typically, hotfixes are made to address a specific user situation. An emergency patch may also be used to address a problem in a software product. The emergency patch may be used when the software problem needs to be fixed immediately, whereas the hotfix collection may be used to fix a problem with less immediacy.

Conventionally, the technical configuration updates may be partially automated via task lists. A task list may consist of an ordered set of tasks or processes. One type of task may update one aspect of the technical configuration (e.g., the task for handling the technical configuration for inbound communication may update the activation state of the OData services). Typically, conventional technical configuration updates are scheduled during business downtime. However, with cloud products, it is desirable to have the products available all the time, with little to no downtime. As such, it is desirable to execute the technical configuration updates as quickly as possible, which is problematic for conventional technical configuration updates. In conventional technical configuration updates, all of the task lists are executed such that each task may access and "update" it's respective technical configuration in the product, when not all of the technical configuration aspects have been updated.

As a non-exhaustive example, a business partner application may be grouped into a business catalog. A task list may include tasks to process the catalog, to determine what service is provided by the application, add/remove authorizations for different roles, and then activate the service provided by the application. When a new application is added that is part of the business catalog, the application service may be activated, and the authorizations added to the business users. With regard to this non-exhaustive example, the cloud-based products may be secured by authorizations, such that not every user at an organization may access the product. These authorizations (technical configurations) may need to be adjusted when a product is changed.

One or more embodiments provide for a technical configuration module to calculate what has changed in the software (e.g., which main objects have changed in the software), determine what technical configurations need to be updated based on those changes, and update only those technical configurations affected by the changes in the software. In one or more embodiments, the updates may be transmitted to relevant clients (e.g., system or business client) of the system, and each client may execute the update for themselves. Embodiments provide for the decoupling of the technical configuration update and actual software change via change requests and virtual change requests. Decoupling the technical configuration update from the actual software change may provide for restartability and resumability of the technical configuration update without repeating the software change when there is a problem with the technical configuration update. The restartability and resumability may include assigning a processing status to each of the virtual change request and object per client. Embodiments may also provide for separating customer and service provider software changes by grouping virtual change requests, including processing queues, such that software changes and updates of technical configuration by the service provider is not blocked by software changes done by a customer. For example, if the cloud service provider provides a hotfix collection to a product, the hotfix collection may be blocked at a particular customer because of a change the customer made to the product. By grouping the virtual change requests and change requests, the system knows that the change was on the customer side.

Continuing with the business catalog example described above, the technical configuration module determines that a first business catalog changed as it received the new application. The system then updates the technical configurations (e.g., the user authorizations) for execution of the service based on that new application.

FIGS. 1-4 include a flow diagram of a process 100 (FIG. 1) for updating technical configuration of a product 402 (FIG. 4) according to some embodiments. Process 100 may be executed by a platform 406 (FIG. 4) according to some embodiments. In one or more embodiments, the platform 406 may be conditioned to perform the process 100, such that a processor 405/510 (FIGS. 4/5) of the system 400/500 is a special purpose element configured to perform operations not performable by a general-purpose computer or device.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S110 a cloud-based software product or application 402 ("application") is installed. The application 402 may be installed on an application server 404 of a cloud platform 406. In one or more embodiments, the application 402 may include one or more main objects 408. An object may contain data in the form of fields ("attributes"), and code in the form of procedures ("methods"). An object's procedures may access and modify the data fields of the object with which they are associated. As part of the application installation, one or more technical configuration parameters 410 associated therewith, are also set to appropriate values. For example, OData services may be technical configuration parameter, that may be set with values of activate or deactivate. Other examples of technical configuration parameters include, but are not limited to, authorizations of a user, and addition or removal of tiles in SAP Fiori® launchpad. In S112, a time-stamp 412 is assigned to the technical configuration parameters 410 when they are set to the appropriate values.

Next, in S114 a change request 414 is received. The change request 414 may be a container including one or more changes to the software application 402. As used herein, the terms "change request" and "transport request" may be used interchangeably. It is noted that each change in the software update may create its own change request. As a non-exhaustive example, if a new OData Service is created, then this is added to the change request. The change request 414 may be created by a developer 401 or other suitable party. The change request 414 may be received at a technical configuration module 416 (FIG. 4) on the platform 406. In one or more embodiments, the change request 414 may include a list of objects 418 ("piece list") that have been changed. As described above, the application may change as a result of different scenarios including, but not limited to, the application is upgraded to a new release; a hotfix collection or emergency patch is applied; a test system is extended by the creation/addition of custom objects; the extensions to the test system are transported to a production system. It is noted that application upgrades, and application of hotfix collections or emergency patches may be referred to as "service provider-related software changes," while customer extensions and transportations of those extensions may be referred to as "customer-related software changes." It is further noted that the customer-related software changes are made on the platform/system directly. The change request 414 may also be assigned a change request time stamp 420 of when it is received.

Then a virtual change request 422 is created by first determining in S116 via the technical configuraiton module 416 whether the change request 414 is a customer-related software change or a service provider-related software change. In one or more embodiments, the change request 414 is distinct from the virtual change request 422. As used herein, the terms "virtual change request" and "virtual transport request" may be used interchangeably. A virtual change request 422 may be a container that includes changes to the technical configuration 410 associated with the changes to the application 402 included in the change request 414. In one or more embodiments, the virtual change request 422 includes a header 424 a creation date and a virtual change request time stamp 426, a status 428 and a list of objects 430 included in the change request 414. The virtual change request 422 may be used to initiate an update of the technical configuration parameters in one or more embodiments. Conventionally, the update of the technical configuration was initiated by the change request 414. As will be further described below, in one or more embodiments, the decoupling of the software change from the technical configuration update may result in a more efficient system because it may provide for restartability and resumability of technical configuration updates without repeating a software change.

The virtual change 422 request may be created and processed via a public Application Programming Interface (API). It is noted that since a public API may be used, it is possible to trigger the update of the technical configuration in any software change-related process (e.g., from a change and transport system (CTS) process, a service provider cockpit (SPC) process, or from any extensibility application.)

When it is determined in S116 that the change request 414 is a customer-related software change, the process proceeds to S118 and a virtual change request 422 is created. When the change request 414 is a customer-related software change, the extensibility application may explicitly create and process the virtual change request 422, via the public API, and the extensibility application may provide the object list 430.

When it is determined in S116 that the change request 414 is a service provider-related software change, instead of receiving the object list (as in the case of the customer-related change) the object list is determined in S120 so that the virtual change request 422 may then be created. To determine the object list 430 in S120, one or more embodiments may provide a new Application Programming Interface (API), as opposed to the originally provided API used to initially set the configuration parameters. One or more embodiments may also provide a new task list 403 ("changed task list") that may use the new API to access database tables that include the changes and determine the object list 430. The API may derive the objects related to the software change from change and transport system (CTS) tables using timer intervals, for example, and create the object list 430. In one or more embodiments, the technical configuration module 416 may determine an interval. As described above, when the technical configuration was previously updated (via an initial setup or other update), the technical configuration received a current timestamp. In one or more embodiments, the technical configuration module 416 determines the interval to be the time between the current time stamp and a new time stamp. In one or more embodiments, the assignation of the timestamp opens an interval. Then, when the change request is received, the interval closes, and a new timestamp is assigned. The technical configuration module 416 next determines the changes that have occurred in this interval by checking the CTS tables, stored in a database 442 (FIG. 4), for example, to see which object changes occurred during this interval. Then the technical configuration module 416 compares the object changes in the CTS tables to the piece list 418 received with the change request 416. When the technical configuration module 416 determines the object changes in the CTS tables correspond to an object on the piece list 418, the object is included in the object list 430.

Once the object list 430 is determined, the process may proceed to S118, and the virtual change request 422 is created.

After the virtual change request 422 is created, the process 100 proceeds to S122 and the virtual change request 422 is received. The virtual change request 422 may be received by a client 216 (e.g., an admin client, a clean, lifecycle business client, etc.). The client in this regard may be any entity having to receive an update of the technical configuration per updates to the software application. It is noted that other clients may receive other task lists that do not include technical configuration, but instead include tasks like creating the object list, as described below with respect to FIG. 3. It is also noted that the technical configuration may not be the same for every client. For example, with an OData service, a system client may not need to update all of the technical configurations associated with an update of this service, while a business client may need all of the updates associated with the OData service. In one or more embodiments, the technical configuration module 416 may push the virtual change request 422, including the object list 430, to the client. In one or more embodiments, the technical configuration module 416 may group two or more virtual change requests by type and external identifier prior to being pushed to the client(s). Then, in S124, the technical configuration is updated for each of the objects in the object list.

In one or more embodiments, the technical configuration may be updated at each client 424 by each client 424 via an API. More specifically, to update the technical configuration, in one or more embodiments the tasks 401 of the task list 403 provided by the API may access the object list 430 and perform the update of the technical configuration for each object in the object list.

It is noted that the system 400 may receive multiple virtual change requests at a same or similar time, as each object that is updated in application update creates its own change request, and therefore a corresponding virtual change request. In one or more embodiments, the virtual change requests 422 may be grouped by type 432 and external identifier (ID) 434. The external identifier 434 may link a technical configuration with the imported software change (e.g., a hotfix collection may be linked to a technical configuration with the external identifier). A group may be defined by the source type of the virtual change request (e.g., customer or service provider). Open virtual change requests (e.g., virtual change requests that have not been processed), that are of a same type and assigned to the same external ID may be processed together. For example, all virtual change requests with type "customer" with initial external session ID are processed together. By using the type attribute 432, customer and service provider software changes may be processed separately. It is noted that the virtual change requests 422 may be further grouped based on the software update (e.g., Hotfix collection group). In instances where the technical configuration update fails, the technical configuration update process may be resumed for the external ID associated with the task that failed, so that the update may be re-tried. In one or more embodiments the groups may be queued, such that the group with the oldest unprocessed virtual change request is processed first, last or in any other suitable order.

In one or more embodiments, when the object list 430 is received by the client 424, each object may have a processing status of new (e.g., create). Then, after processing by the client 424, each object in the object list may have a processing status 428 of changed, complete or error (e.g., was unable to be processed by the client). The processing status 428 may be set by the task that tried to execute the update. When the processing of the virtual change request 422 fails (e.g., error status), the client may re-try the update of the particular update that failed. When a first execution of the update fails, a second execution of the update may be initiated at the point where the last error occurred. For example, the system may not have to re-try processing all of the objects in the object list, and instead continues to try to update the technical configuration at the point (e.g., object) where the update failed. Additionally, because the software update is separate from the technical configuration update, this resumption of the technical configuration update may be executed without repeating the software change. It is noted that, in embodiments, an aspect of the system receiving the update or the update itself may be manipulated prior to re-trying the update.

In one or more embodiments, the client 424 may also restart the update of the objects in the object list per re-starting the appropriate task list. Thereby, the update of the technical configuration is re-started for all objects associated with tasks in the task list (e.g., all objects) related to new software changes and objects related to old software changes for which the update of the configuration has not been processed successfully. As a non-exhaustive example, a Resume fails and a hotfix is needed to fix it. Once the hotfix is imported (as a software change), then it could be resumed. However, since there was another software change, the old and the new changes should be processed.

In one or more embodiments, the system 400 may include a tenant multiplexer (TM) 436. In one or more embodiments, the TM 436 may take a cross-client object list 430 from the change task list 407 and then locks onto a client 216 and pushes the object list 430 to the task list 403 at the client 216 (e.g., Admin client; clean, lifecycle business client). The task list 403 then goes through their tasks and updates the technical configuration, based on the object list The tasks 401 may be executed and the technical configuration is updated for each client. It is noted that the TM 436 may perform the same process for each client, but there may be different results at each client because each client may have different aspects that need to be updated from the virtual change request 422 and cascade the object list 430 to all relevant clients of the system (e.g., system, lifecycle, clean, and business client). This client-dependent object list may be persisted in all relevant clients and the task list 403 is executed per client, such that the tasks 401 of the change task list 403 may access the object list 430 and perform the update of the technical configuration based on the list. It is noted that while the TM 436 executes the change task list 403, it may be used to execute other task lists that may be cascaded to other clients of the system (e.g., for scope changes).

In one or more embodiments, a user (e.g., a developer) may manually create a virtual change request 422. The manually created virtual change request may trigger the update of the technical configuration of a single object, which may ease analysis and facilitate fixing problems with the software update. In one or more embodiments, the manually created virtual change request may be accessible via an auto-approved access level. In contrast, in one or more embodiments, the direct execution of the task list needs explicit approval.

Figure 2:
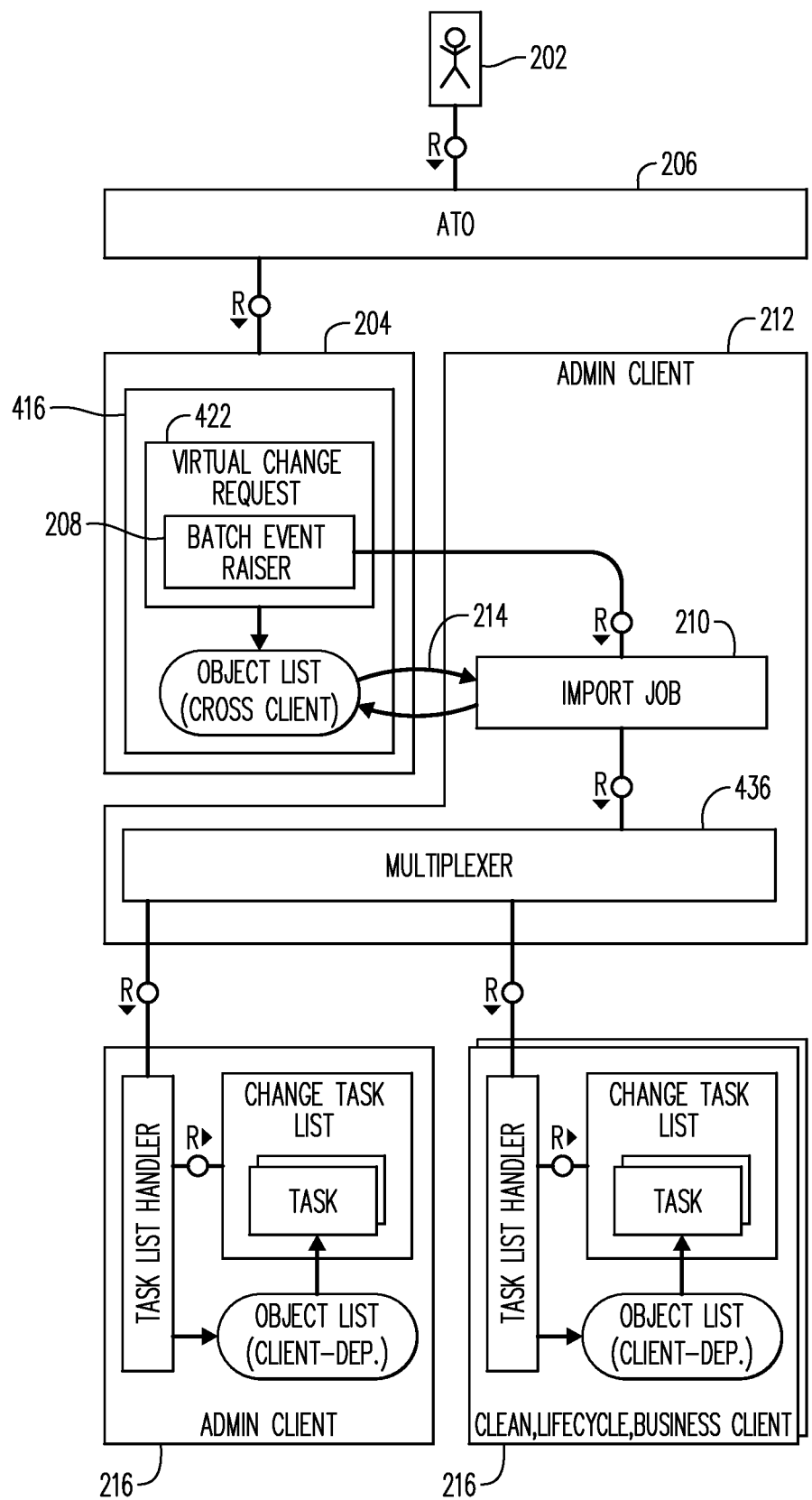
FIG. 2 is a block diagram of usage of virtual change requests according to some embodiments.

Turning to FIG. 2, a block diagram of a non-exhaustive example of a virtual change request and multiplexer in customer transports is provided. The user 202 imports updated software to a client system 204 via the adaptation transport organizer (ATO) 206. The technical configuration module 416 creates a virtual change request 422, as described above with respect to FIG. 1, and may release the virtual change request via an API. The API may be retrieved by the technical configuration module. Upon release of the virtual change request, a batch event indicating the release may be raised via a batch event raiser 208. A job 210 at the admin client 212 may listen for events, and when the batch event is raised, the job 210 may import the released virtual change requests and may assign a status to the requests of "importing/released". When there is more than one virtual change request, they may be processed in groups with external session IDs, as described above with respect to FIG. 1.

In one or more embodiments, the job 210 may set a cross-client lock 214 for the object list included in the virtual change request. If job determines the cross-client lock 214 is already set, this means another job is already using the multiplexer 436 to cascade updates. As such, in one or more embodiments, the current job will quit and the job (not shown) that is already using the multiplexer 436 will also cascade the virtual change requests.

The job 210 may also determine whether any multiplex-relevant objects (i.e., objects that are relevant for technical configuration) are contained in the group of virtual change requests. The job 210 may call the multiplexer 436 with the (cross-client) object list 430 of virtual change requests.

Then, the multiplexer 436 itself may perform a Remote Function Call (RFC) call (e.g., technology used to communicate between systems and/or clients) in all multiplex-relevant clients 216 (e.g., admin, clean, lifecycle, business client). It is noted that, in one or more embodiments, the clients, 212 and 216, may be the same. However, a process may be executed in a user context, so that in 212 it is technical user SAP_SYSTEM, for example, and in 216 it is user SAP_LMADM. In one or more embodiments, the admin client 216 may be called before any other client. For each client, a client-dependent lock may be set. Then the multiplexer 436 transfers the (cross-client) object list into a client-dependent object list. If there already exists a task list run for the external session ID assigned to this object list, this task list is resumed, as described above. Otherwise, a new task list is created at the client to update the technical configuration. The tasks 401 of the task list 403 may process the (client-dependent) object list at the client from the object list API. The multiplexer 436 sets a status for each object in the client-dependent object list according to the task list status. In one or more embodiments, an initial status may be set when the object list is created. When the task list is executed successfully, the status may be set to "Succeeded", otherwise the status may be set to "Error." Once the multiplexer 436 has processed all the clients (e.g., received an indication from each client that each object was updated or not), the status of the virtual change request at the MT may be changed. If no error occurred, the status may be set to "Imported." Otherwise the status may be set to "Error," and the problem (e.g., error in task list run, client locked, client not available, etc.) persists until remedied. In either case (Imported or Error), the "import" job ends. When there are still virtual change requests with the status "importing/released" (e.g., new virtual change requests or virtual change requests from a different group), the job 210 processes these as described above.

It is noted that in one or more embodiments, virtual change requests and client-dependent object lists older than a pre-set number of days (e.g., 90 days), may be removed from the system (e.g., deleted) automatically.

Figure 3:
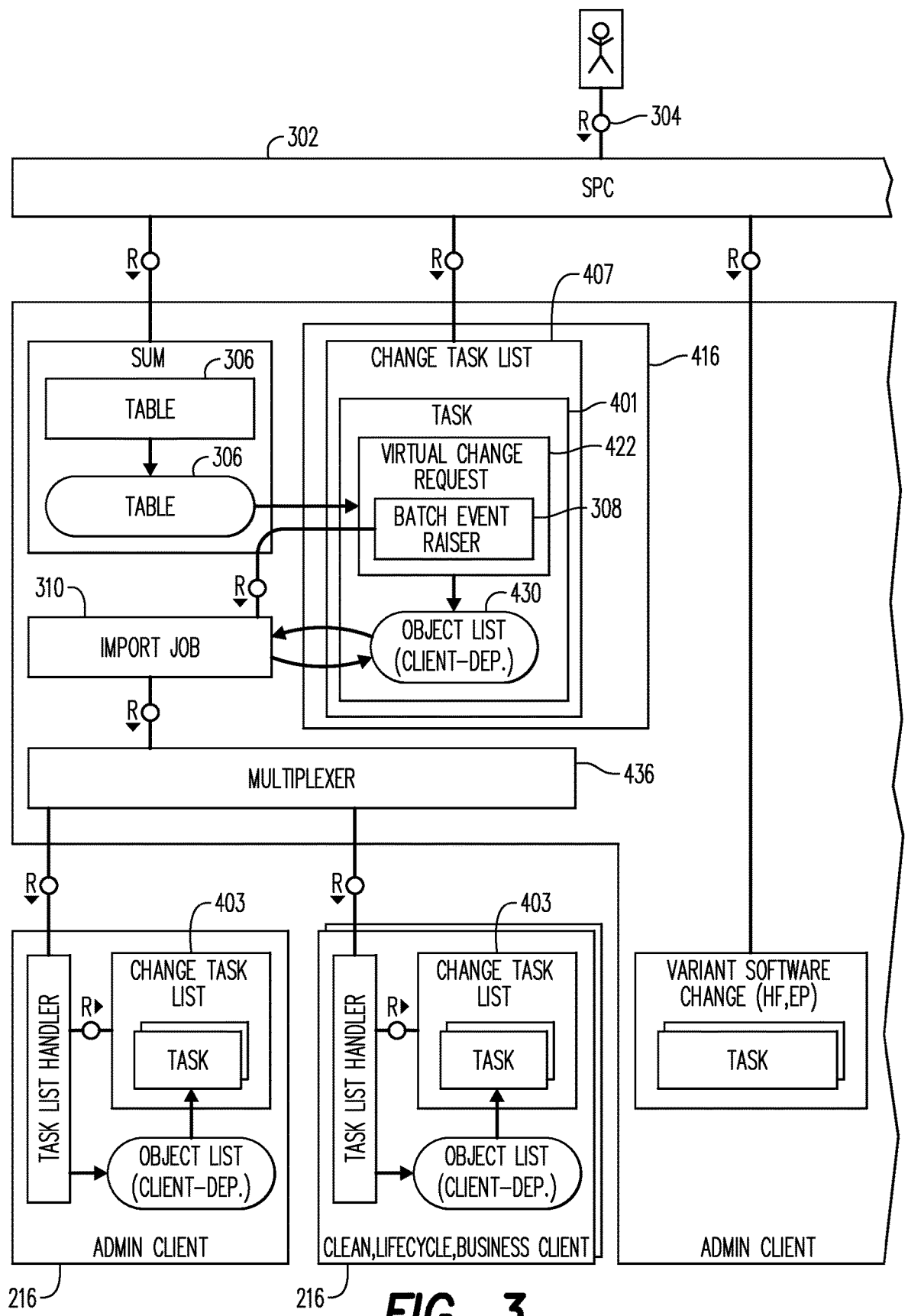
FIG. 3 is a block diagram of an update of technical configuration according to some embodiments.

Turning to FIG. 3, a block diagram of a non-exhaustive example of an update of a technical configuration after the import of a hotfix collection application is provided. It is noted that there may be different types of task lists. For example, FIG. 3 includes two different types of task lists—407 and 403. The task list 403 associated with the admin client, and clean, lfiecycle, business client is a task lists that updates technical configuration (e.g., activation of service, addition of authorization, creation of tiles on Fiori® launchpad, etc.). However, the other task list 407 may not update the technical configuration, but instead does the calculations to determine the object list 430.

A service provider cockpit (SPC) 302 imports a hotfix collection 304 in a change request 414. The change request 414 may be written to one or more tables 306. Then the the change in the task list 407 is executed to create a virtual change request of type "service provider" for each change request imported since the last execution of the change task list (as descierbed above with respect to S120), and updates the time-stamp. As described above, the virtual change request includes the objects of the change request as determined by the technical configuration module 416. For example, when the change request includes a LIMU METH object, the virtual change request includes the main R3TR CLAS object that corresponds to the LIMU METH object. In embodiments, all virtual change requests that originate from a single update instance (e.g., hotfix collection), may be assigned the same external session IDs to ensure these updates are processed together. In other embodiments, virtual change requests that originate from a single update instance may be assigned different external session IDs. If the technical configuration module 416 determines there are old virtual change requests that have a status of "error," the status of these virtual change requests may be reset and then may be assigned the same external session ID as the new one. Thereby, erroneous virtual change requests may be processed together with the new ones. It is noted that technical configuration needs to be updated successfully for every software change, for if a technical configuration is omitted, the system may not behave as expected. If it cannot update successfully for hotfix collection N, then maybe it is successful with hotfix collection N+1. In one or more embodiments, the system may process the latest changes with changes that have yet not been processed successfully at the time of the latest change such that all of the technical configurations are updated successfully for every software change.

After the virtual change request is created, then the task 401 raises a batch event 308 to release the virtual change requests, and the status of the virtual change requests changes to "released." As described above, with respect to FIG. 2, a job 310 may listen for events, and when the batch event is raised, the job 310 may import the released virtual change requests and may have a status of "importing/released".

The job 310 may also determine whether any multiplex-relevant objects are contained in the group of virtual change requests. The job 310 may call the multiplexer 436 with the (cross-client) object list 430 of virtual change requests. Then, the multiplexer 436 itself may perform an RFC call in all multiplex-relevant clients. In one or more embodiments, the admin client 216 may be called before any other client 216. For each client, a client-dependent lock may be set. Then the multiplexer transfers the (cross-client) object list into a client-dependent object list.

The tasks of the task list may process the (client-dependent) object list at the client from the object list API. The multiplexer 436 sets a status for each object in the client-dependent object list according to the task list status. Once the multiplexer 436 has processed all the clients (e.g., received an indication from each client that each object was updated or not), the status of the virtual change request at the MT may be changed to "imported" to indicate the end of the job, irrespective of the status of the virtual change request (e.g., Imported or Error). The task change list may wait for the result of the virtual change request processing from the multiplexer 436. Once all virtual change requests have been imported, the change task list may be finalized.

In one or more embodiments, the SPC 302 polls the status of the change task list regularly to determine whether it has been finalized. Any tasks that failed may be resumed, as described above with respect to FIG. 1. In one or more embodiments, the task may be bound to the external session ID created above. As such, when the task is resumed, then it may retry all virtual change requests with status "Error" that are assigned the same external session ID. Tasks of the task list having that same session ID that were processed successfully beforehand will not be repeated, and the system 100 may continue with the next unprocessed task.

Figure 4:
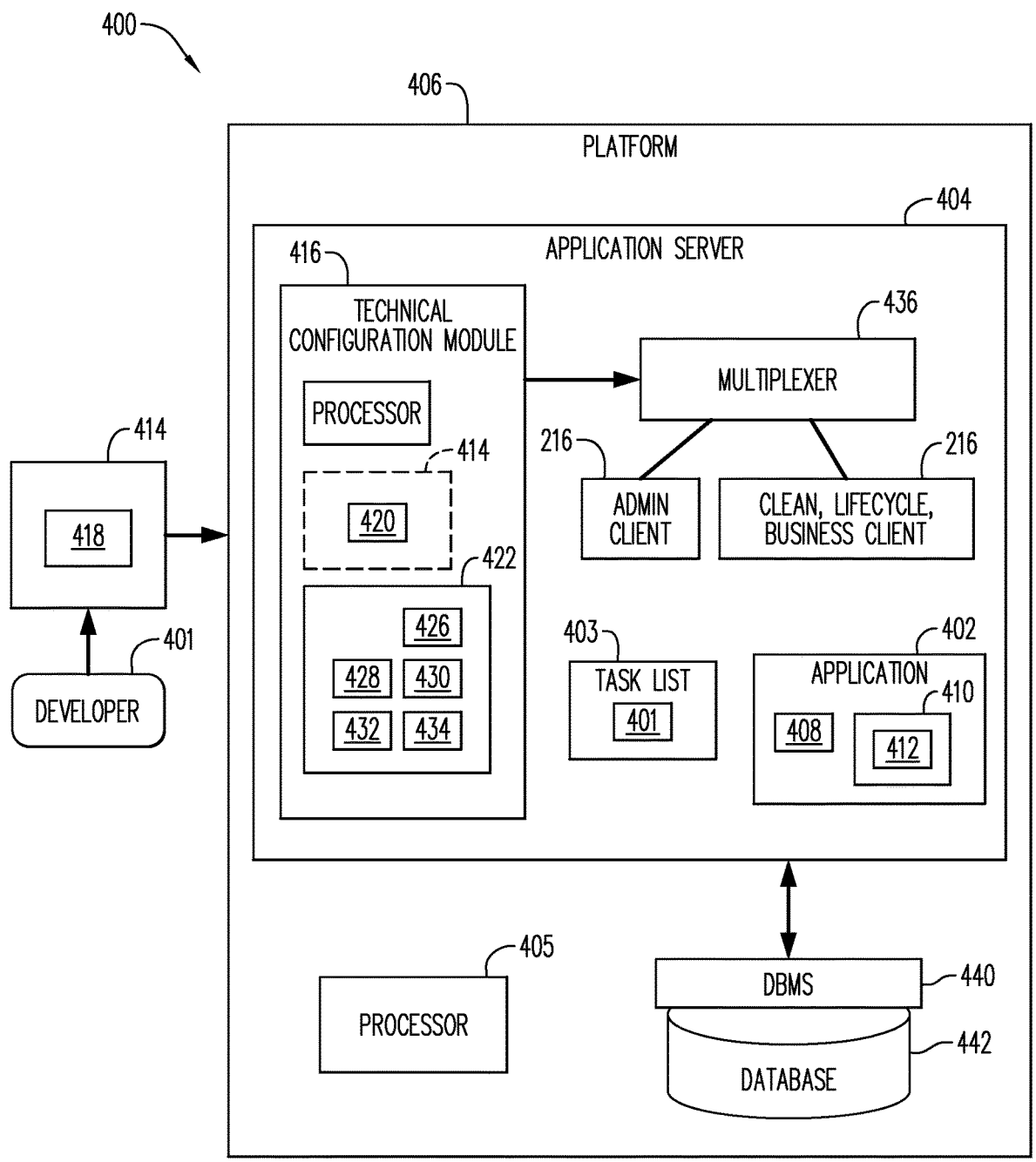
FIG. 4 is a block diagram of a system architecture according to some embodiments.

FIG. 4 is a block diagram of system architecture 400 according to some embodiments. Embodiments are not limited to architecture 400 or to a three-tier database architecture.

Architecture 400 includes platform 406, an application server 404, an application 402, a technical configuration module 416, a multiplexer 436, a developer 401, a client 403, a database 440 and a database management system or service (DBMS) 442. In one or more embodiments, the technical configuration module 416 and multiplexer 436, clients 216 and task list 403 may reside on the application server 404. Applications 402 may comprise server-side executable program code (e.g., compiled code, scripts, etc.) executing within application server 404 to receive queries from clients and provide results to clients based on data of database 440 per the DBMS 442.

Application server 404 provides any suitable interfaces through which clients 320 and developer may communicate with the technical configuration module 416 or applications 402 executing on application server 404.

One or more applications 402 executing on server 404 may communicate with DBMS 440 using database management interfaces such as, but not limited to, Open Database Connectivity (ODBC) and Java Database Connectivity (JDBC) interfaces. These types of applications 335 may use Structured Query Language (SQL) to manage and query data stored in database 310.

DBMS 440 serves requests to retrieve and/or modify data of database 442, and also performs administrative and management functions. Such functions may include snapshot and backup management, indexing, optimization, garbage collection, and/or any other database functions that are or become known. DBMS 440 may also provide application logic, such as database procedures and/or calculations, according to some embodiments. This application logic may comprise scripts, functional libraries and/or compiled program code.

Application server 404 may be separated from, or closely integrated with, DBMS 440. A closely-integrated application server 404 may enable execution of server applications completely on the database platform, without the need for an additional application server. For example, according to some embodiments, application server 404 provides a comprehensive set of embedded services which provide end-to-end support for Web-based applications. The services may include a lightweight web server, configurable support for OData, server-side JavaScript execution and access to SQL and SQLScript.

Application server 404 may provide application services (e.g., via functional libraries) which applications 402 may use to manage and query the data of database 442. The application services can be used to expose the database data model, with its tables, hierarchies, views and database procedures, to clients. In addition to exposing the data model, application server 404 may host system services such as a search service.

Database 442 may store data used by at least one of: applications 402 and the technical configuration module 416. For example, database 442 may store technical configuration parameters (data values) that may be stored with a timestamp.

Database 442 may comprise any query-responsive data source or sources that are or become known, including but not limited to a structured-query language (SQL) relational database management system. Database 442 may comprise a relational database, a multi-dimensional database, an eXtendable Markup Language (XML) document, or any other data storage system storing structured and/or unstructured data. The data of database 442 may be distributed among several relational databases, dimensional databases, and/or other data sources. Embodiments are not limited to any number or types of data sources.

In some embodiments, the data of database 442 may comprise one or more of conventional tabular data, row-based data, column-based data, and object-based data. Moreover, the data may be indexed and/or selectively replicated in an index to allow fast searching and retrieval thereof. Database 442 may support multi-tenancy to separately support multiple unrelated clients by providing multiple logical database systems which are programmatically isolated from one another.

Database 442 may implement an "in-memory" database, in which a full database is stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Figure 5:
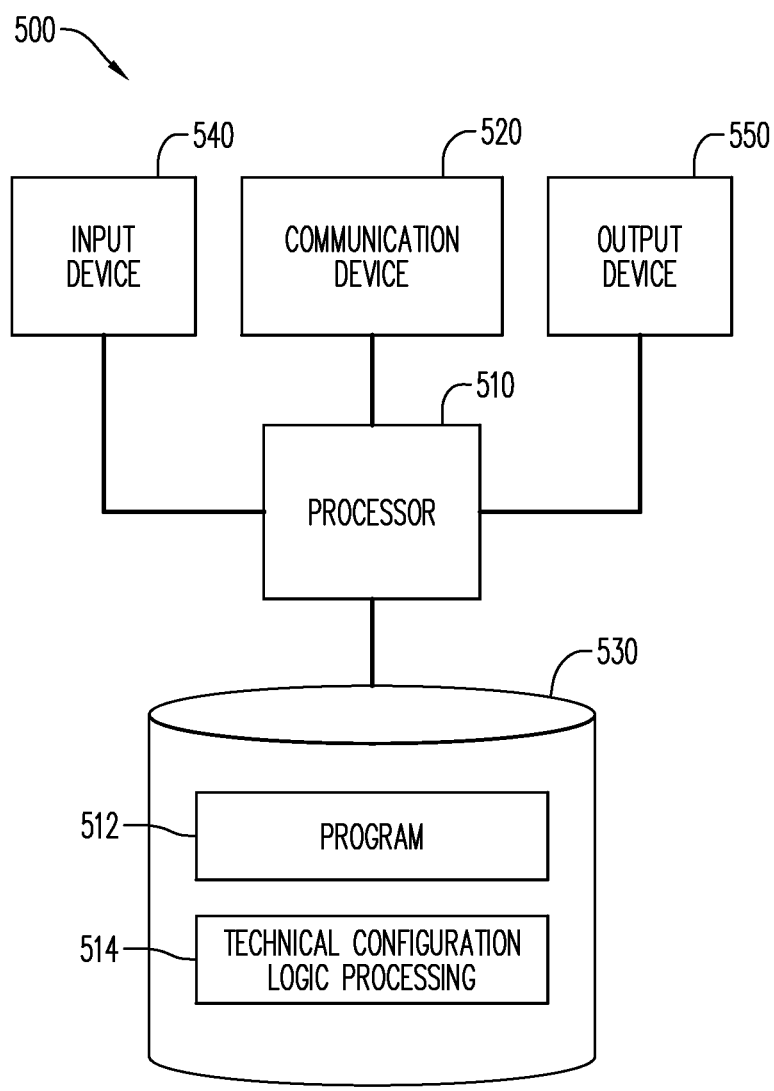
FIG. 5 is a block diagram of a system according to some embodiments.

FIG. 5 is a block diagram of apparatus 500 according to some embodiments. Apparatus 500 may comprise a general- or special-purpose computing apparatus and may execute program code to perform any of the functions described herein. Apparatus 500 may comprise an implementation of one or more elements of system 400. Apparatus 500 may include other unshown elements according to some embodiments.

Apparatus 500 may comprise a general- or special-purpose computing apparatus and may execute program code to perform any of the functions described herein. Apparatus 500 may comprise an implementation of one or more elements of system 400. Apparatus 900 may include other unshown elements according to some embodiments.

Apparatus 500 includes a technical configuration processor 510 operatively coupled to communication device 520, data storage device 530, one or more input devices 540, one or more output devices 550 and memory 560. Communication device 520 may facilitate communication with external devices, such as application server 404. Input device(s) 540 may comprise, for example, a keyboard, a keypad, a mouse or other pointing device, a microphone, knob or a switch, an infra-red (IR) port, a docking station, and/or a touch screen. Input device(s) 540 may be used, for example, to manipulate graphical user interfaces and to input information into apparatus 500. Output device(s) 550 may comprise, for example, a display (e.g., a display screen) a speaker, and/or a printer.

Data storage device/memory 530 may comprise any device, including combinations of magnetic storage devices (e.g., magnetic tape, hard disk drives and flash memory), optical storage devices, Read Only Memory (ROM) devices, Random Access Memory (RAM) etc.

The storage device 530 stores a program 512 and/or technical configuration platform logic 514 for controlling the processor 510. It is noted that program 512 and/or technical configuration platform logic 514 may also be stored and executed from an application server or from any other environment (e.g., software architecture) that can execute software instructions. The processor 510 performs instructions of the programs 512, 514, and thereby operates in accordance with any of the embodiments described herein, including but not limited to process 100. The executable instructions of the programs 512, 514 represent the executable instructions of the software architecture, including implementation of the methods, modules, subsystems and components and so forth described herein and may also include memory and/or storage modules . . . etc.

The programs 512, 514 may be stored in a compressed, uncompiled and/or encrypted format. The programs 512, 514 may furthermore include other program elements, such as an operating system, a database management system, and/or device drivers used by the processor 510 to interface with peripheral devices.

The foregoing diagrams represent logical architectures for describing processes according to some embodiments, and actual implementations may include more, or different, components arranged in other manners. Other topologies may be used in conjunction with other embodiments. Moreover, each system described herein may be implemented by any number of computing devices in communication with one another via any number of other public and/or private networks. Two or more of such computing devices may be located remotely from one another and may communicate with one another via any known manner of network(s) and/or a dedicated connection. Each computing device may comprise any number of hardware and/or software elements suitable to provide the functions described herein as well as any other functions. For example, any computing device used in an implementation of system 400 may include a processor to execute program code such that the computing device operates as described herein.

All systems and processes discussed herein may be embodied in program code stored on one or more computer-readable non-transitory media. Such non-transitory media may include, for example, a fixed disk, a floppy disk, a CD-ROM, a DVD-ROM, a Flash drive, magnetic tape, and solid-state RAM or ROM storage units. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A system comprising:
   a technical configuration module;
   a software application;
   a technical configuration processor in communication with the technical configuration module and operative to execute processor-executable process steps to cause the system to:
   receive a change request including one or more changes to the software application;
   determine one or more changes to at least one object of a technical configuration of a changed software application based on the one or more changes to the software application;
   create a virtual change request including the one or more changes to the at least one object of the technical configuration associated with the changes to the software application included in the change request;
   receive the virtual change request including a list of changed objects; and
   execute an update to the at least one object of the technical configuration based on the determined one or more changes received in the virtual change request, wherein execution is initiated via the received virtual change request.

2. The system of claim 1, wherein the change request is distinct from the virtual change request.

3. The system of claim 1, wherein the update is executed in response to the received virtual change request.

4. The system of claim 1, further comprising:
a multiplexer operative to:
receive the virtual change request; and
retrieve the list of changed objects.

5. The system of claim 4, wherein the multiplexer is further operative to:
push the list of changed objects with determined one or more changes to one or more clients for execution of the update.

6. The system of claim 5, wherein each object in the list of changed objects is associated with a processing status.

7. The system of claim 5, wherein each client processes the list of changed objects with determined one or more changes to execute the update.

8. The system of claim 5, wherein two or more virtual change requests are grouped by type and external identifier prior to being pushed to the one or more clients.

9. The system of claim 5, wherein, when a first execution of the update fails at the one or more clients, a second execution of the update is initiated at a point of where a last error occurred.

10. The system of claim 1, wherein the virtual change request is created and processed via a public application programming interface (API).

11. A computer-implemented method comprising:
receiving a change request including one or more changes to a software application;
determining one or more changes to at least one object of a technical configuration of a changed software application based on the one or more changes to the software application;
creating a virtual change request including the one or more changes to the at least one object of the technical configuration associated with the changes to the software application included in the change request;
receiving the virtual change request including a list of changed objects, wherein the change request is distinct from the virtual change request; and
executing an update to the at least one object of the technical configuration based on the determined one or more changes received in the virtual change request, wherein execution is initiated via the received virtual change request.

12. The method of claim 11, wherein the update is executed in response to the received virtual change request.

13. The method of claim 11, further comprising:
receiving, at a multiplexer, the virtual change request; and
retrieving, via the multiplexer, the list of changed objects.

14. The method of claim 11, further comprising:
pushing, via a multiplexer, the list of changed objects to one or more clients for execution of the update.

15. The method of claim 14, wherein each object in the list of changed objects is associated with a processing status.

16. The method of claim 14, wherein each client of the one or more clients processes the list of changed objects to execute the update.

17. The method of claim 14, wherein two or more virtual change requests are grouped by type and external identifier prior to being pushed to the one or more clients.

18. A non-transitory computer-readable medium storing program code, the program code executable by a computer system to cause the computer system to:
receive a change request including one or more changes to a software application;
determine one or more changes to at least one object of a technical configuration of a changed software application based on the one or more changes to the software application;
create a virtual change request including the one or more changes to the at least one object of the technical configuration associated with the changes to the software application included in the change request;
receive the virtual change request including a list of changed objects; and
execute an update to the at least one object of the technical configuration based on the determined one or more changes received in the virtual change request, wherein execution is initiated via the received virtual change request.

19. The medium of claim 18, wherein the change request is distinct from the virtual change request.

20. The medium of claim 18, wherein the update is executed in response to the received virtual change request.

* * * * *